US011028704B2

(12) United States Patent
Dasgupta et al.

(10) Patent No.: US 11,028,704 B2
(45) Date of Patent: Jun. 8, 2021

(54) TURBINE BLADE ASSEMBLY INCLUDING MULTIPLE CERAMIC MATRIX COMPOSITE COMPONENTS

(71) Applicant: SIEMENS ENERGY, INC., Orlando, FL (US)

(72) Inventors: Arindam Dasgupta, Avon, CT (US); Anand A. Kulkarni, Charlotte, NC (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 16/663,999

(22) Filed: Oct. 25, 2019

(65) Prior Publication Data

US 2020/0173293 A1    Jun. 4, 2020

Related U.S. Application Data

(63) Continuation-in-part of application No. 15/073,967, filed on Mar. 18, 2016, now abandoned.

(51) Int. Cl.
 *F01D 5/28* (2006.01)
 *B32B 7/04* (2019.01)
 (Continued)

(52) U.S. Cl.
 CPC .............. *F01D 5/282* (2013.01); *B28B 1/001* (2013.01); *B32B 7/04* (2013.01); *C04B 35/64* (2013.01);
 (Continued)

(58) Field of Classification Search
 CPC ... F01D 5/12; F01D 5/14; F01D 5/147; F01D 5/28; F01D 5/282; F01D 5/286;
 (Continued)

(56) References Cited

U.S. PATENT DOCUMENTS

| 2006/0121265 A1 | 6/2006 | Thompson et al. |
| 2007/0140835 A1 | 6/2007 | Albrecht et al. |
| 2008/0279678 A1 | 11/2008 | Merrill et al. |

FOREIGN PATENT DOCUMENTS

| RU | 2261334 C1 | 9/2005 |
| RU | 2464450 C1 | 10/2012 |

*Primary Examiner* — Walter Aughenbaugh

(57) ABSTRACT

A turbine blade having an airfoil portion includes a first ceramic matrix composite (CMC) component having a first outer surface and a second ceramic matrix composite (CMC) component having a second outer surface. The second CMC component is positioned adjacent the first CMC component such that the first outer surface and the second outer surface align with one another and at least partially define the airfoil portion. A ceramic bead is at least partially formed at an interface between the first CMC component and the second CMC component. The formation of the bead melts a portion of the first CMC component and the second CMC component, such that the ceramic bead, the first CMC component, and the second CMC component become a single contiguous component and the bead fixedly attaches the first CMC component and the second CMC component. The bead includes a bead outer surface that extends outward beyond the first outer surface and the second outer surface and an overlayer is deposited onto the airfoil portion, the overlayer bonded to the first outer surface, the second outer surface, and the bead outer surface.

20 Claims, 5 Drawing Sheets

(51) Int. Cl.
  *F01D 5/14* (2006.01)
  *C04B 35/64* (2006.01)
  *B28B 1/00* (2006.01)

(52) U.S. Cl.
  CPC ............ *F01D 5/147* (2013.01); *F01D 5/284* (2013.01); *C04B 2237/84* (2013.01); *F05D 2300/6033* (2013.01)

(58) Field of Classification Search
  CPC ... F01D 5/18; F01D 5/189; B32B 1/02; B32B 1/08; B32B 7/04; B32B 7/08; B32B 7/12; B32B 7/14; B32B 18/00
  See application file for complete search history.

TURBINE BLADE ASSEMBLY INCLUDING MULTIPLE CERAMIC MATRIX COMPOSITE COMPONENTS

TECHNICAL FIELD

The invention relates to gas turbine components formed by joining a stack of ceramic matrix composite (CMC) components, and more specifically, to a method of joining such CMC components with a ceramic deposit additively deposited onto the stack.

BACKGROUND

Economics and environmental demands are driving the efficiency of combined cycle power plants with gas turbine engine topping cycles increasingly higher. In order to achieve this efficiency, the gas turbine cycle needs to operate at turbine inlet temperatures as high as 1600 to 1800 degrees Centigrade. At these temperatures, material operating limits are being reached and/or cooling flow requirements increase so much that the benefit of the higher inlet temperature is offset.

SUMMARY

A turbine blade having an airfoil portion includes a first ceramic matrix composite (CMC) component having a first outer surface and a second ceramic matrix composite (CMC) component having a second outer surface. The second CMC component is positioned adjacent the first CMC component such that the first outer surface and the second outer surface align with one another and at least partially define the airfoil portion. A ceramic bead is at least partially formed at an interface between the first CMC component and the second CMC component. The formation of the bead melts a portion of the first CMC component and the second CMC component, such that the ceramic bead, the first CMC component, and the second CMC component become a single contiguous component and the bead fixedly attaches the first CMC component and the second CMC component. The bead includes a bead outer surface that extends outward beyond the first outer surface and the second outer surface and an overlayer is deposited onto the airfoil portion, the overlayer bonded to the first outer surface, the second outer surface, and the bead outer surface.

In another construction, a turbine blade having an airfoil portion includes a plurality of ceramic matrix composite (CMC) components each having a bottom surface, a top surface spaced apart from the bottom surface, and an outer closed surface that extends between the bottom surface and the top surface, one of the bottom surface and the top surface of each CMC layer positioned adjacent the other of the bottom surface and the top surface of an adjacent CMC component such that the outer closed surfaces cooperate to define the airfoil portion. A plurality of seams are formed at an interface between two adjacent CMC components and extend around the outer closed surface to define a closed loop and a plurality of ceramic beads are each formed at and extend completely around one of the plurality of seams, the formation of each bead melting a portion of the CMC components that define the respective seam to fixedly attach the adjacent CMC components to one another, each bead including a bead outer surface that extends outward beyond the outer closed surface, and an overlayer deposited onto the airfoil portion, the overlayer bonded to the outer closed surfaces of the plurality of CMC components and the bead outer surface.

In another construction, a method of manufacturing a turbine blade having an airfoil portion includes forming a plurality of CMC components, each CMC component including an outer surface that defines a portion of the airfoil portion, positioning a first of the plurality of CMC components adjacent a second of the plurality of CMC components, and applying a ceramic bead between the first of the plurality of CMC components and the second of the plurality of CMC components, the ceramic bead fixedly attaching the first of the plurality of CMC components and the second of the plurality of CMC components such that their outer surfaces align to define a partial airfoil, and wherein the ceramic bead includes a bead outer surface that extends outward of the outer surfaces. The method further includes positioning a free CMC component of the plurality of CMC components adjacent the partial airfoil such that the outer surface of the free CMC component is aligned with the outer surface of the partial airfoil, and forming an additional ceramic bead between the free CMC component and the partial airfoil to fixedly attach the free CMC component to the partial airfoil, the additional ceramic bead including an additional bead outer surface that extends outward of the outer surface of the partial airfoil. The method also includes repeating the positioning a free CMC component and the forming an additional ceramic bead steps until the partial airfoil fully defines the airfoil portion, and applying an overlay to the airfoil portion, the overlay bonding to the outer surfaces of each of the plurality of CMC components, and each of the bead outer surfaces.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
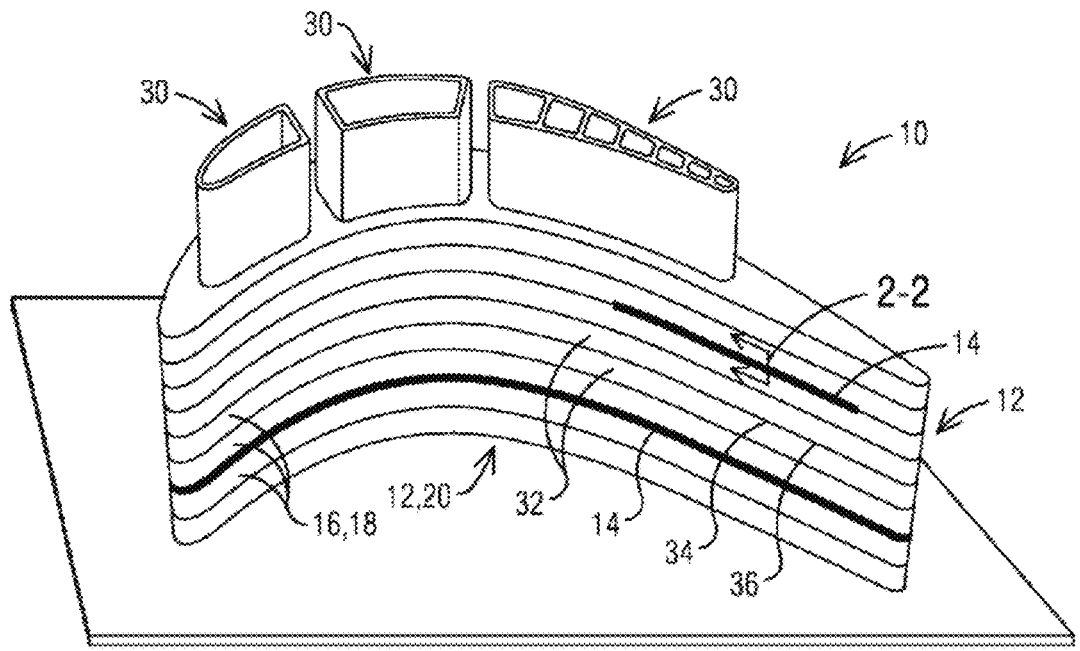
FIG. 1 is a is a perspective illustration of an exemplary embodiment of a gas turbine component formed from a plurality of CMC components and a ceramic deposit thereon.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

The present inventors have devised an innovative CMC laminate structure that provides for improved structural integrity, improved sealing between layers, and improved adherence of any applied overlayer. The proposed structure includes a ceramic deposit additively formed on the CMC stack. The ceramic deposit may be applied such that it bonds at least two adjacent CMC layers to each other. It may also be deposited such that it forms a raised structure that will increase adherence of an overlayer. The ceramic deposit may be the only way the CMC layers are bonded together, and the ceramic deposit may form a gas tight seal so combustion gases do not pass between the CMC layers. Alternately, the CMC layers may also be bonded together and sealed using conventional means, such as with adhesive, such that an interface between adjacent CMC layers may be bonded and sealed using a combination of one or more ceramic deposits and adhesive. The inventors have also devised a method for applying the ceramic deposit using a laser beam to heat and melt ceramic powder to form the ceramic deposit via an additive manufacturing process.

It is known to melt an edge of a single CMC layer, as disclosed in U.S. Publication number 2007/0075455 to Marini et al. However, Marini discloses merely sealing a free edge of a single layer in order to improve wear resistance or hardness, and this results in a smooth coating/deposit. The method disclosed herein bonds plural CMC layers together along their adjoining edges with a ceramic deposit that may be rougher and therefore more suited for overlayer adherence than the smooth coating of Mariana. As used herein each CMC layer is a discrete structure prior to any bonding operation. That is to say that while each CMC layer may include resin material as part of its composition, abutting CMC layers are not bonded together by the matrix material that may be present within any individual CMC layer. Accordingly, while the CMC layer itself may be a laminate in that it may include fiber layers bonded together by a resin material, each CMC layer is considered a single, discrete CMC layer herein.

FIG. 1 is an illustration of an exemplary embodiment of a gas turbine component 10 formed of a CMC stack 12 and a ceramic deposit 14 thereon. The CMC stack 12 includes a plurality of CMC components 16, such as an oxide-oxide composite. In this exemplary embodiment, each CMC component 16 is in the form of a layer 18 of an airfoil portion 20 of the component 10, where the component 10 may be a gas turbine engine blade or vane. Also included is a metal core 30. In this exemplary embodiment the metal core 30 is partially hollow, with cavities that may function as cooling channels. In this configuration the CMC components 16 of the CMC stack 12 protect the metal core 30 from combustion gases while the metal core 30 provides strength for the component 10. However, the disclosure is not meant to be limited to such a specific structure and the teaching may be applied more broadly as would be understood by those of ordinary skill in the art.

The ceramic deposit 14 is in the shape of a bead that bonds adjacent CMC layers 32 together, similar to an edge weld bead. The adjacent CMC layers 32 define an interface 34 there between (e.g. an area defined by faying surfaces) having a perimeter 36. A ceramic deposit 14 may extend along part of the perimeter 36 or it may extend along the entire perimeter 36. Various embodiments of the CMC stack 12 may include ceramic deposits 14 that extend along part of the perimeter 36, ceramic deposits 14 that extend along the entire perimeter 36, or a combination of the two. The selection of full or part extension of the ceramic deposit 14 and/or the use of adhesive between adjacent CMC layers 32 may be based on a desired/predetermined mechanical characteristic of the component 10 when complete. For example, partial edge bonding with a ceramic deposit 14 allows for some flexibility within the structure, whereas adhesive alone or adhesive and edge bonding may provide a stronger/less flexible structure. Any combination of edge bonding, adhesive and/or bolting may be used to achieve a desired mechanical characteristic in the component 10.

Moreover, the porosity of the ceramic deposit 14 may be controlled by controlling the deposition process to be from approximately forty percent to ninety percent to achieve a desired mechanical characteristic including, for example, permeability and rigidity. When formed as a non-permeable (gas-tight) ceramic deposit, and when formed between adjacent CMC layers 32, the ceramic deposit 14 seals the adjacent CMC layers 32 such that combustion gases cannot pass there between to reach the metal core 30. The porosity of the ceramic deposit 14 also controls the modulus of elasticity (rigidity) of the ceramic deposit 14. The strain tolerance of the ceramic deposit 14 is associated with the modulus of elasticity. Therefore, controlling the porosity can control the rigidity of the ceramic deposit as well as the strain tolerance. Accordingly, if a compliant bond (securement) between the adjacent CMC layers is desired, the ceramic deposit 14 may be made more porous. Alternately, if a rigid bond is preferred, the ceramic deposit 14 may be made less porous. The mechanical characteristics may be controlled such that they are uniform throughout the ceramic deposit 14, or so that they vary locally from one ceramic deposit 14 to another, or within a given ceramic deposit 14 as desired.

Figure 2:
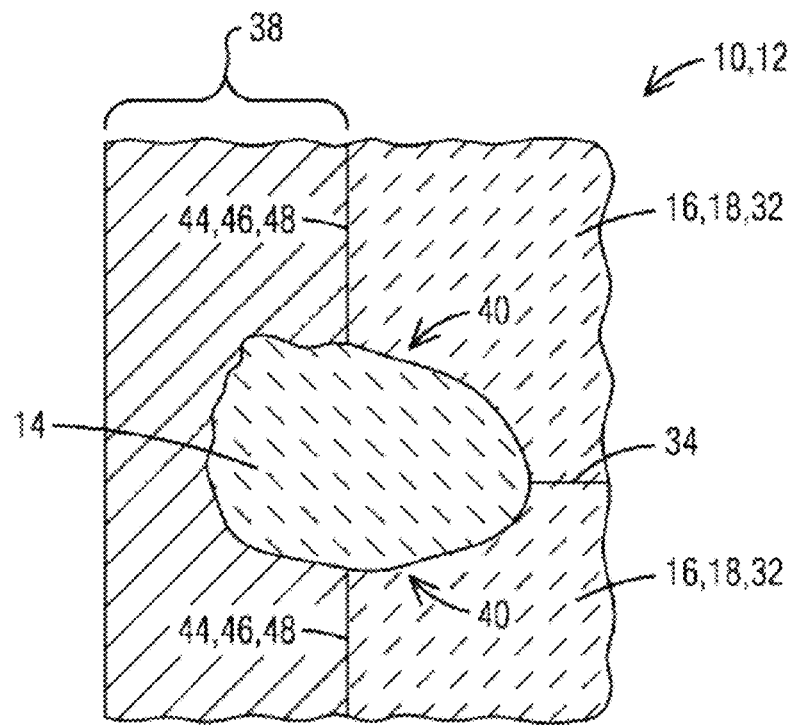
FIG. 2 is a sectional view of the ceramic deposit of FIG. 1 along line 2-2 illustrated after an overlayer coating has been added.

FIG. 2 is a sectional view of the ceramic deposit 14 of FIG. 1 along line 2-2, to which an overlayer 38 has been added. The ceramic deposit 14 forms a bead that joins corners or edges 40 of the adjacent CMC layers 32, thereby forming a seal 42 there between that prevents combustion gases from passing through the interface 34. The ceramic deposit 14 is raised with respect to a surface 44 of the component 10 formed by edge faces 46 of respective CMC components 16. Accordingly, in an exemplary embodiment, the ceramic deposit does not cover the entire edge face 46. If a ceramic deposit 14 is formed on both corners of one edge face 46, there may still be a remainder 48 of the edge face 46, and hence of the surface 44, that is not covered with the ceramic deposit 14. The elevated nature of the ceramic deposit 14 relative to surface 44 provides a greater surface area that increases adherence for the overlayer 38. The ceramic deposit 14 may also be shaped to include features that may better engage the overlayer 38, such as grooves, overhangs, etc. These, in turn, improve design life and spallation resistance of the overlayer 38.

Figure 3:
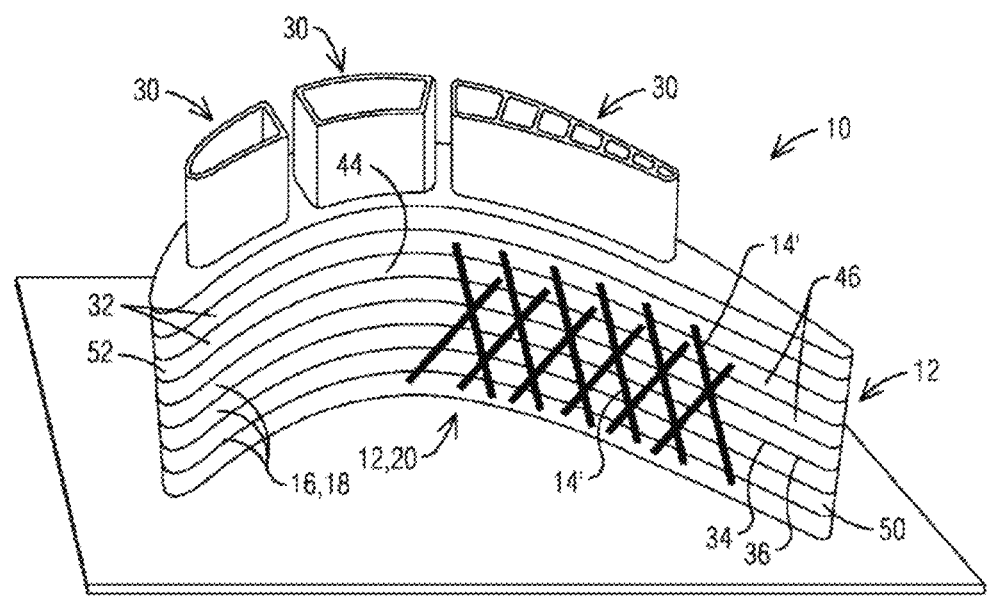
FIG. 3 is a perspective illustration of an alternate exemplary embodiment of a gas turbine component.

FIG. 3 is an illustration of an alternate exemplary embodiment where the ceramic deposit 14' forms a pattern on the surface 44 of the component. The ceramic deposit 14' is bonded to respective edge faces 46 of at least two adjacent CMC layers 32, and because it spans the respective interface 34, the ceramic deposit 14' secures the adjacent CMC layers 32 to each other. As above, the mechanical characteristics can be controlled as desired within the pattern to produce predetermined mechanical characteristics. For example, toward a trailing edge 50, the ceramic deposit 14' may be deposited to be denser, and hence more rigid, for structural integrity. Toward a leading edge 52, the ceramic deposit 14' may be more porous and flexible, thereby increasing its ability to absorb impacts, thereby reducing foreign object damage (FOD). In another example, the ceramic deposit 14' may be formed to be gas-tight, yet porous enough to permit minor deformation of the CMC stack 12 proximate the metal core 30, which provides the ultimate structural stability where present.

While a crisscross pattern is shown, any pattern may be used as will be understood by those of ordinary skill in the art. For example, beads of the pattern may be spaced closer together where greater overlayer adherence is sought. Likewise, a height, width, aspect ratio (e.g. 3; 1 to 5:1 in terms of height/thickness to width), cross sectional shape, and surface roughness of the ceramic deposit 14, 14' may also be controlled locally to achieve the balance of structural integrity, flexibility, and overlayer adherence sought.

Figure 4:
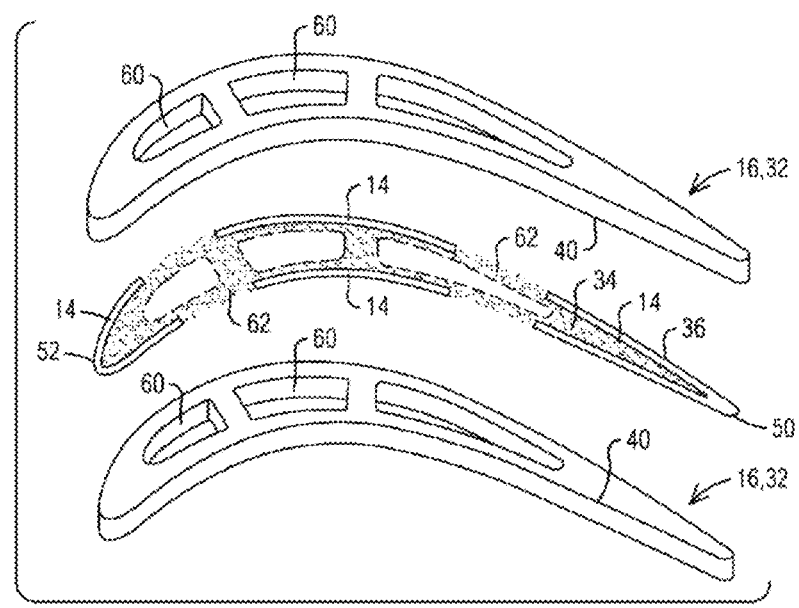
FIG. 4 is a schematic illustration of an interface between adjacent CMC layers.

FIG. 4 is a schematic illustration of adjacent CMC layers 32 and the interface 34 between the adjacent CMC layers 32. The interface 34 is defined by an area in between the adjacent CMC layers 32, akin to a faying area. Openings 60 in the CMC components 16 receive the metal core 30 (not shown) and the interface 34 stands between combustion gases outside the CMC stack 12 and the openings 60. Therefore, the interface 34 may be sealed to prevent intrusion of the combustion gases between the CMC components 16 so that the combustion gas does not reach the openings 60 and the metal core 30 therein. The seal may be achieved by forming the ceramic deposit 14 around the entire perimeter 36 of the interface 34. Alternately, the seal may be achieved by combining one or more ceramic deposits 14 with adhesive 62 in a manner that provides a continuous seal around the perimeter 36.

The adhesive 62 may permit little relative movement between the adjacent CMC layers 32 where applied. The ceramic deposit 14 secures the edges 40 of the adjacent CMC layers 32, but does not extend into the interface 34, and therefore may permit more relative movement between the adjacent CMC layers 32. Accordingly, the interface 34 can be tailored to control relative movement locally within each interface 34 depending on design requirements.

Figure 5:
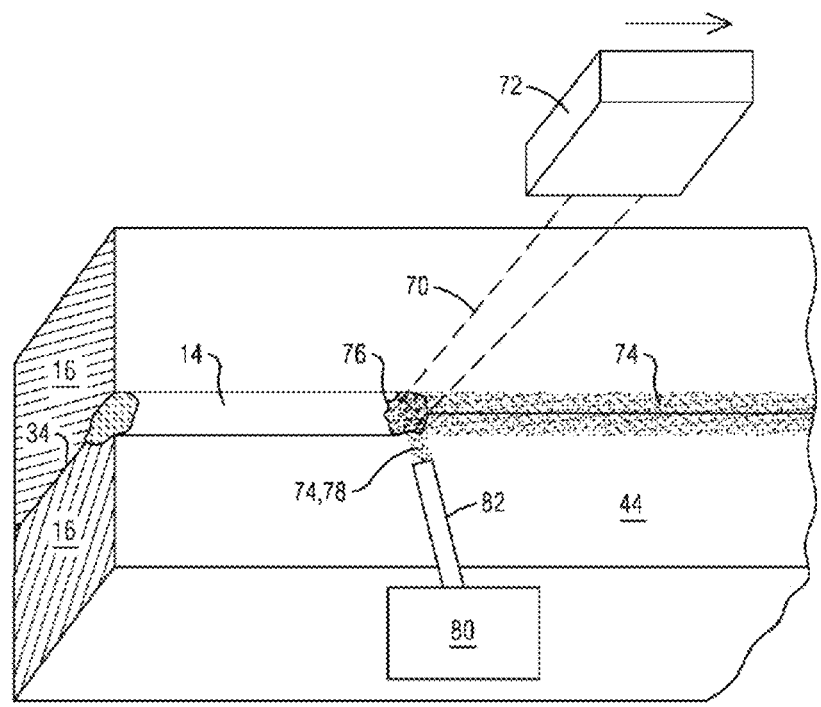
FIG. 5 schematically illustrates a method of forming the ceramic deposit of FIG. 1.

FIG. 5 schematically illustrates an exemplary embodiment of a method of forming the ceramic deposit 14, 14', and in particular the ceramic deposit 14 of FIG. 1. In this exemplary embodiment, the ceramic deposit is formed by traversing an energy beam 70 emitted from an energy beam source 72, such as a laser, to melt ceramic material. The molten ceramic material then cools to form the ceramic deposit 14. The energy beam source 72 may be a green laser system with 512 nanometer wavelength and may generate a laser beam with a spot size of approximately fifty micrometers.

The process may be autogenous such that the ceramic that is melted is ceramic from the CMC components 16. Alternately, or in addition, ceramic powder 74 may be used as filler and preplaced on the surface 44 where the ceramic deposit 14 is to be formed. The ceramic powder 74 may include particles from one (1) micron and above. Alternately, or in addition, the ceramic powder 74 may be fed to a process location 76 via a ceramic powder stream 78 delivered from a ceramic powder source 80 via a delivery tube 82. Other embodiments may use a paste, tape or ribbon to provide the ceramic filler material for the ceramic deposit. The ceramic to be melted, whether part of the CMC components 16 or a separate filler material, may be semi or non-transparent to the selected energy beam 70 in order to capture the heat energy. Filler material may be provided with or without a binder material.

The process for forming the ceramic deposit 14 may be iterative. In such an exemplary embodiment, the ceramic deposit 14 may be built up in layers, where each layer is produced by melting ceramic in the manner disclosed above. Each layer may be from ten (10) microns thick to two (2) millimeters thick. The component 10 may be positioned in a bed of ceramic powder (not shown), a respective layer formed, the component lowered, and the next layer formed on the previously formed layer. Such a process would allow for one dimensional (1D) prints (ceramic deposit 14), two dimensional (2D) prints (ceramic deposit 14'), and three dimensional (3D) ceramic deposits, meaning that in the sectional view of FIG. 2, a cross-sectional shape of the ceramic deposit 14 could engineered as desired to better adhere the overlayer 38 to the CMC stack 12, such as with an overhang or undercut.

Figure 6:
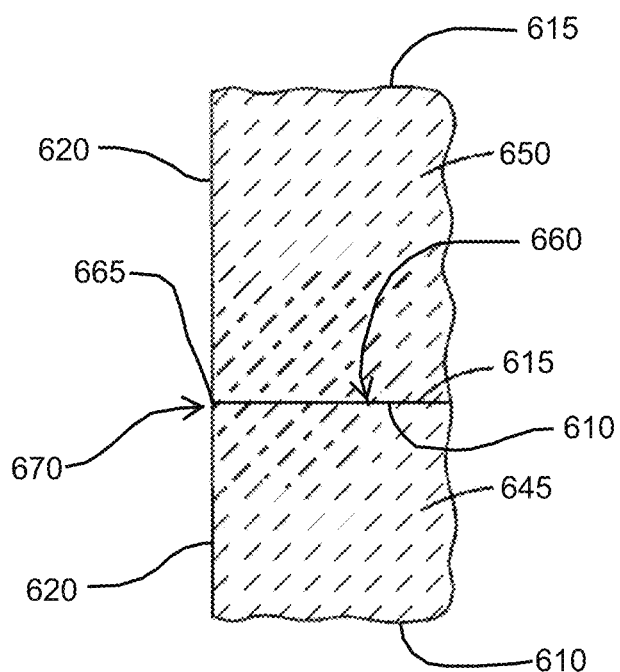
FIG. 6 is a sectional view of the turbine blade of FIG. 1 along line 2-2 illustrated after arranging a first CMC component adjacent a second CMC component.
Figure 10:
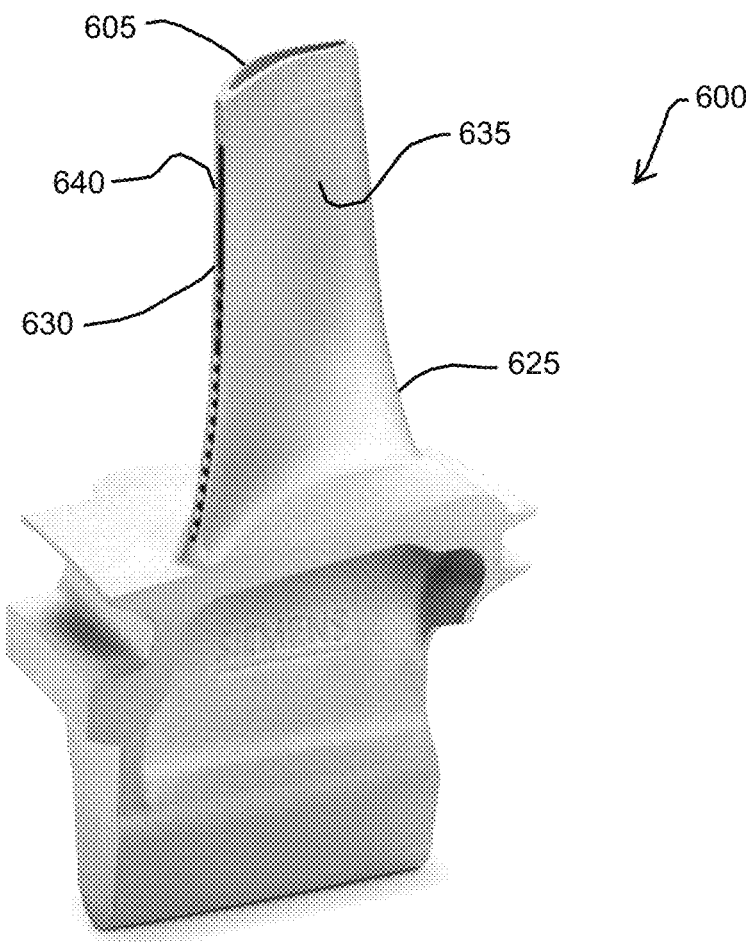
FIG. 10 is a perspective view of a turbine blade including an airfoil portion.

FIGS. 6-9 are provided to better illustrate and describe the manufacturing process for manufacturing a turbine blade 600 as described above, and more specifically for forming an airfoil portion 605 of the blade 600. The manufacturing process begins as shown in FIG. 6. Specifically, a plurality of CMC components 16 are formed with each of the CMC components 16 including a first or bottom surface 610, a second or top surface 615 spaced apart from the bottom surface 610, and an outer surface 620 that extends between the bottom surface 610 and the top surface 615. In preferred arrangements, the bottom surfaces 610 and the top surfaces 615 are planar and the outer surface 620 is a continuous airfoil-shaped surface that includes a leading edge 625, a trailing edge 630, a pressure side 635, and a suction side 640 as shown in FIG. 10. Each CMC component 16 includes at least one through aperture 60, shown in FIGS. 1, 3, and 4 that extends from the bottom surface 610 to the top surface 615. In the construction illustrated in FIG. 1, each CMC component 16 includes three through apertures 60.

Metallic core pieces 30 are positioned and fit or sized such that each core piece 30 passes through one of the apertures 60 formed in each of the CMC components 16. This arrangement allows the core pieces 30 to aid in aligning the CMC components 16 with respect to one another and provides additional strength and rigidity to the completed airfoil portion 605. The construction of FIG. 1 includes three core pieces 30 with fewer or more core pieces 30 being possible.

The airfoil portion 605 of the blade 600 can be formed on a support structure, or on the platform of the stationary or rotating blade 600 as may be desired. In addition, while the figures discussed herein focus on the formation of a blade 600 and more specifically, an airfoil portion 605 of the blade 600, the same techniques could be used on other components.

With reference to FIG. 1, any number of CMC components 16 could be used to form the airfoil portion 605 of the turbine blade 600. FIGS. 6-9 illustrate the formation and connection of two CMC components 645, 650 and it should be understood that this connection could be used between any two adjacent CMC components 16 to complete the airfoil portion 605 of the blade 600.

Turning now to FIG. 6, a cross-section of a portion of the two CMC components 645, 650 is illustrated immediately after the second of the CMC components 650 is positioned adjacent the first of the CMC components 645. As used herein, the term "adjacent" should be read to include a spacing that is close enough to allow for the formation of a bead 655 (shown in FIG. 7) that connects the CMC components 645, 650. While this definition would allow for a small gap between the two CMC components 645, 650, preferred arrangements include direct contact between the first CMC component 645 and the second CMC component 650, or contact with an adhesive that is positioned between the CMC components 645, 650 to facilitate their attachment.

After the first CMC component 645 is positioned with the bottom surface 610 being on the bottom and the top surface 615 exposed at the top, the second CMC component 650 is juxtaposed adjacent the first CMC component 645 such that the bottom surface 610 of the second CMC component 650 is positioned adjacent the top surface 615 of the first CMC component 645, thereby defining an interface 660 therebetween. If used, an adhesive is placed at this interface 660 between the CMC components 645, 650 prior to their positioning as illustrated in FIG. 6.

An outermost edge 665 of the bottom surface 610 of the second CMC component 650 (or the top surface 615 of the first CMC component 645) extends around the outer surface 620 of the respective CMC component 645, 650 and defines a seam 670 between the first CMC component 645 and the second CMC component 650.

Figure 7:
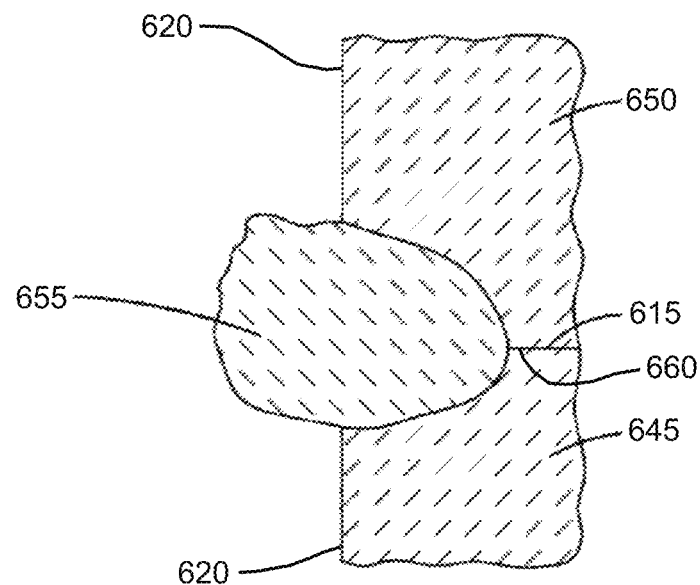
FIG. 7 is a sectional view of the turbine blade of FIG. 1 along line 2-2 illustrated during the application of a ceramic bead that attaches the first CMC component to the second CMC component.

As illustrated in FIG. 7, in some constructions, the bead 655 is formed in the seam 670 to permanently attach the adjacent CMC components 650. As used herein, permanent means that the bead 655 must be destroyed or broken in order to separate the CMC components 650. The bead 655 could extend completely around the seam 670 to seal the interface 660 between the first CMC component 645 and the second CMC component 650. In other constructions, the bead 655 is intermittent but generally follows the seam 670, with still other constructions including beads 655 that cross the seam 670 and reside largely on the outer surfaces 620 of the first CMC component 645 and the second component 650 (see FIG. 3).

As discussed earlier, the beads 655 or ceramic deposits 14 are formed using an additive manufacturing process wherein a supply of powdered material is deposited on or near the seam 670 in a desired quantity and an energy source (e.g., a laser) is directed at the powdered material to melt the powdered material and some of the base material surrounding the powdered material. With continued reference to FIG. 7, one suitable process for the application of the bead 655 is a laser deposition process in which a laser heats and melts a powdered material and melts portions of the first CMC component 645 and the second CMC component 650. Specifically, the area around the top edge 665 of the first CMC component 645 and the bottom edge of the second CMC component 650 are melted during the process. As can be seen in FIG. 7, the melting of the CMC components 645, 650 does not extend to the full depth of the CMC components 645, 650 such that some of the interface 660 remains intact.

Figure 8:
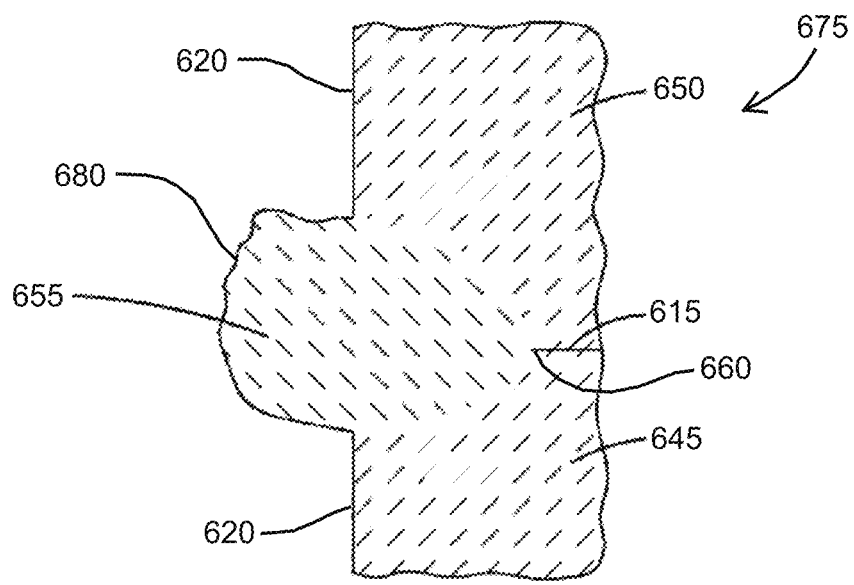
FIG. 8 is a sectional view of the turbine blade of FIG. 1 along line 2-2 illustrated after the application of the ceramic bead that attaches the first CMC component to the second CMC component.
Figure 9:
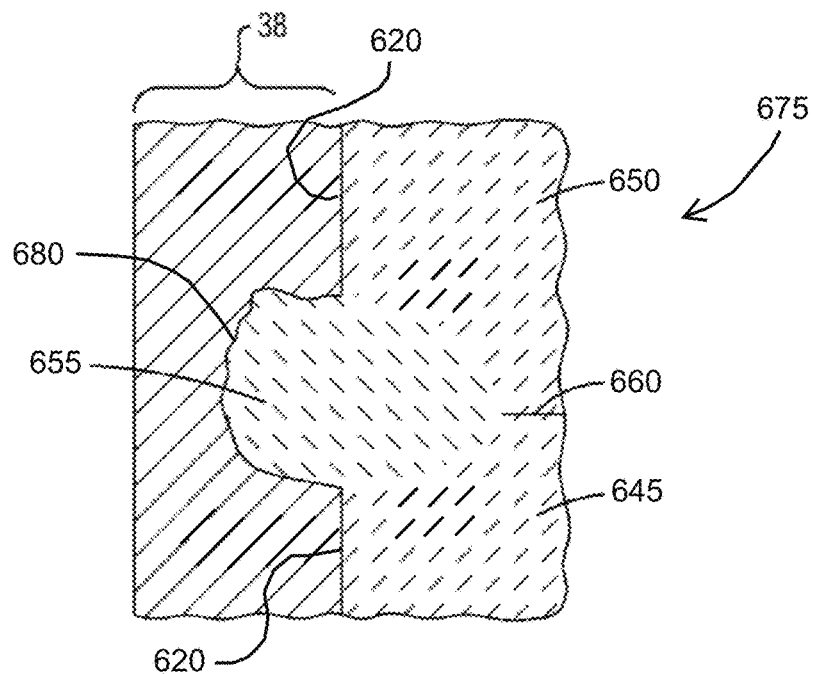
FIG. 9 is a sectional view of the turbine blade of FIG. 1 along line 2-2 illustrated after an overlayer coating has been added.

With reference to FIGS. 7 and 8, as the bead 655 is formed, the melted materials from the first CMC component 645 and the second CMC component 650 melt and mix with some of the material used to form the bead 655. These materials solidify as illustrated in FIG. 8 such that the bead 655, the first CMC component 645, and the second CMC component 650 are essentially a single continuous component, sometimes referred to herein as a partial airfoil 675. The bead 655 is formed such that it includes an exposed surface 680 that extends beyond the outer surfaces 620 of the CMC components 645, 650.

The process described with reference to FIGS. 6-8 is repeated with each subsequent CMC component 16 until the partial airfoil 675 reaches the desired size of the completed airfoil portion 605. At this point, a number of CMC components 16 are arranged with each seam 670 between CMC components 16 having a bead 655 formed therein and having exposed surfaces 680 extending beyond the outer surfaces 620 of the various CMC components 16.

To complete the airfoil portion 605, an overlayer 38 is applied to the outer surface 620 of the CMC components 16 and the exposed surfaces 680 of the beads 655. In most constructions, the overlayer 38 is a thermal barrier coating that is sprayed using a metal spray process onto the exposed surfaces 680 of the airfoil portion 605. The raised beads 655 enhance the attachment of the overlayer 38 as they act as hooks or additional surface area for the connection.

The innovative component and method proposed herein enables the manufacture of gas turbine components having improved structural integrity and overlayer adherence. These improvements can be tailored locally between adjacent CMC layers as well as locally in regions of the component spanning plural CMC layers, thereby increasing design flexibility. Accordingly, this represents a significant improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A turbine blade having an airfoil portion, the turbine blade comprising:
   a first ceramic matrix composite (CMC) component having a first outer surface that is non-planar;
   a second ceramic matrix composite (CMC) component having a second outer surface that is non-planar, the second CMC component positioned adjacent the first CMC component such that the first outer surface and the second outer surface at least partially define the airfoil portion;
   a ceramic bead at least partially positioned at an interface between the first outer surface and the second outer surface, the ceramic bead, the first CMC component, and the second CMC component defining a single contiguous component and the bead fixedly attaching the first CMC component and the second CMC component to one another, the bead including a bead outer surface that extends outward beyond the first outer surface and the second outer surface; and
   an overlayer deposited onto the airfoil portion, the overlayer bonded to the first outer surface, the second outer surface, and the bead outer surface.

2. The turbine blade of claim 1, wherein the first outer surface and the second outer surface each define a leading edge, a trailing edge, a pressure side and a suction side that cooperate to define a continuous airfoil shape.

3. The turbine blade of claim 1, wherein each of the first CMC component and the second CMC component includes a bottom surface and a top surface spaced apart from the bottom surface, the first outer surface extending between the bottom surface and the top surface of the first CMC component and the second outer surface extending between the bottom surface and the top surface of the second CMC component.

4. The turbine blade of claim 3, wherein the bottom surface of the second CMC component is juxtaposed adjacent the top surface of the first CMC component to define the interface, and wherein an outer edge of the bottom surface of the second CMC component and an outer edge of the top surface of the first CMC component cooperate to define a seam.

5. The turbine blade of claim 4, wherein the ceramic bead is formed using a laser and extends continuously along the seam.

6. The turbine blade of claim 3, wherein the first CMC component and the second CMC component each define an aperture that extends from the bottom surface to the top surface, the turbine blade further comprising a metallic core that extends through the aperture of the first CMC component and the second CMC component.

7. The turbine blade of claim 1, further comprising an adhesive positioned between the first CMC component and the second CMC component to at least partially bond the first CMC component to the second CMC component.

8. The turbine blade of claim 1, wherein the overlayer is a thermal barrier coating that is sprayed onto the first outer surface, the second outer surface, and the bead outer surface.

9. A turbine blade having an airfoil portion, the turbine blade comprising:
   a plurality of ceramic matrix composite (CMC) components each having a bottom surface, a top surface spaced apart from the bottom surface, and an outer closed surface that extends between the bottom surface and the top surface, the outer closed surface being non-planar, one of the bottom surface and the top surface of each CMC plurality of CMC components positioned adjacent the other of the bottom surface and the top surface of an adjacent CMC component of the plurality of CMC components such that the outer closed surfaces cooperate to define the airfoil portion;
   a plurality of seams, each seam defined at an interface between two adjacent CMC components and extending around an edge of the outer closed surface of one of the two adjacent CMC components to define a closed loop;

a plurality of ceramic beads each positioned at and extending completely around one of the plurality of seams, each bead fixedly attaching the two adjacent CMC components that define the respective seam to one another, each bead including a bead outer surface that extends outward beyond the outer closed surface of one of the two adjacent CMC components that define the respective seam; and an overlayer deposited onto the airfoil portion, the overlayer bonded to the outer closed surfaces of the plurality of CMC components and the bead outer surface.

10. The turbine blade of claim 9, wherein the overlayer is a thermal barrier coating that is sprayed onto the outer closed surface of each of the plurality of CMC components and to the bead outer surface of each of the plurality of ceramic beads.

11. The turbine blade of claim 9, wherein each outer closed surface defines a leading edge, a trailing edge, a pressure side and a suction side that cooperate to define a continuous airfoil shape, and wherein each CMC component includes an aperture that extends from the bottom surface to the top surface.

12. The turbine blade of claim 11, further comprising a metallic core sized to fit within the aperture, and wherein a first CMC component of the plurality of CMC components is positioned with the metallic core passing through the aperture and extending beyond the top surface.

13. The turbine blade of claim 12, wherein a second CMC component of the plurality of CMC components includes a second bottom surface that is juxtaposed adjacent the top surface of the first CMC component, and wherein the metallic core passes through the aperture in the second CMC component and extends beyond a second top surface of the second CMC component, the top surface of the first CMC component and the second bottom surface of the second CMC component cooperating to define the interface.

14. The turbine blade of claim 9, wherein each ceramic bead is formed using a laser and a supply of powdered material.

15. The turbine blade of claim 9, further comprising an adhesive positioned between adjacent CMC components to at least partially bond adjacent CMC components to one another.

16. The turbine blade of claim 12, wherein each CMC component defines a second aperture that extends from the bottom surface to the top surface, the turbine blade further comprising a second metallic core that extends through the second apertures of each CMC component.

17. A method of manufacturing a turbine blade having an airfoil portion, the method comprising:

forming a plurality of CMC components, each CMC component including an outer surface that defines a portion of the airfoil portion, the outer surface being non-planar;

positioning a first of the plurality of CMC components adjacent a second of the plurality of CMC components;

applying a ceramic bead between the first of the plurality of CMC components and the second of the plurality of CMC components, the ceramic bead fixedly attaching the first of the plurality of CMC components and the second of the plurality of CMC components such that their outer surfaces cooperate to define a partial airfoil, and wherein the ceramic bead includes a bead outer surface that extends outward of the outer surfaces;

positioning a free CMC component of the plurality of CMC components adjacent the partial airfoil;

forming an additional ceramic bead between the free CMC component and the partial airfoil to fixedly attach the free CMC component to the partial airfoil, the additional ceramic bead including an additional bead outer surface that extends outward of the outer surface of the partial airfoil;

repeating the positioning a free CMC component and the forming an additional ceramic bead steps until the partial airfoil fully defines the airfoil portion; and applying an overlay to the airfoil portion, the overlay bonding to the outer surfaces of each of the plurality of CMC components, and each of the bead outer surfaces.

18. The method of manufacturing a turbine blade of claim 17, wherein positioning the first of the plurality of CMC components adjacent the second of the CMC components defines a seam that extends continuously around the outer surface of the first of the plurality of CMC components, and wherein the ceramic bead is applied to the seam and extends continuously around the first of the plurality of CMC components.

19. The method of manufacturing a turbine blade of claim 18, further comprising laser melting a material, a portion of the first CMC component adjacent the seam, and a portion of the second CMC component adjacent the seam, the material, the melted portion of the first CMC component, and the melted portion of the second CMC component solidifying such that the bead permanently attaches the first CMC component to the second CMC component.

20. The method of manufacturing a turbine blade of claim 17, further comprising spraying the overlay onto the outer surface of each of the plurality of CMC components, the bead outer surface, and the additional bead outer surface.

* * * * *